(12) United States Patent
Pedro et al.

(10) Patent No.: US 8,995,908 B2
(45) Date of Patent: Mar. 31, 2015

(54) MOBILE COMMUNICATIONS SYSTEM PROVIDING ENHANCED OUT OF BAND (OOB) BLUETOOTH PAIRING AND RELATED METHODS

(75) Inventors: Justin Manuel Pedro, Waterloo (CA); Marin Blazevic, Bochum (DE); Xianfeng Chen, Mississauga (CA); Dong Duc Hai Nguyen, Castrop-Rauxel (DE)

(73) Assignee: BlackBerry Limited, Waterloo, Ontario (CA)

( * ) Notice: Subject to any disclaimer, the term of this patent is extended or adjusted under 35 U.S.C. 154(b) by 243 days.

(21) Appl. No.: 13/419,987

(22) Filed: Mar. 14, 2012

(65) Prior Publication Data

US 2013/0189924 A1 Jul. 25, 2013

(51) Int. Cl.
| | |
|---|---|
| H04B 5/00 | (2006.01) |
| H04B 5/02 | (2006.01) |
| H04W 4/00 | (2009.01) |
| H04W 8/00 | (2009.01) |

(52) U.S. Cl.
CPC ............... *H04B 5/02* (2013.01); *H04W 4/008* (2013.01); *H04W 8/005* (2013.01)
USPC .......................................... 455/41.1; 375/256

(58) Field of Classification Search
CPC ............................................... G06K 19/0723
USPC ................................................ 455/41.1, 41.2
See application file for complete search history.

(56) References Cited

U.S. PATENT DOCUMENTS

| | | | | |
|---|---|---|---|---|
| 4,442,504 A | * | 4/1984 | Dummermuth et al. | 710/264 |
| 7,024,482 B2 | * | 4/2006 | Hlasny | 709/227 |
| 7,031,660 B2 | * | 4/2006 | Vonheim et al. | 455/41.2 |
| 7,366,552 B2 | * | 4/2008 | Khoo | 455/575.1 |
| 7,475,148 B2 | * | 1/2009 | Hlasny | 709/227 |
| 7,646,316 B2 | * | 1/2010 | Khoo | 341/22 |
| 8,299,895 B2 | * | 10/2012 | Harris | 340/5.72 |
| 8,504,889 B2 | * | 8/2013 | Husted et al. | 714/749 |
| 8,756,684 B2 | * | 6/2014 | Frantz et al. | 726/22 |
| 8,792,826 B2 | * | 7/2014 | Willis | 455/41.2 |
| 2002/0147816 A1 | * | 10/2002 | Hlasny | 709/227 |
| 2004/0185857 A1 | * | 9/2004 | Lee et al. | 455/445 |
| 2005/0208983 A1 | * | 9/2005 | Khoo | 455/575.1 |

(Continued)

OTHER PUBLICATIONS

Johnson Consulting, "Bluetooth-An Overview", Apr. 17, 2004, http://www.swedetrack.com/images/bluet14.htm.*

(Continued)

*Primary Examiner* — Hai V Nguyen
(74) *Attorney, Agent, or Firm* — Allen, Dyer, Doppelt, Milbrath & Gilchrist, P.A.

(57) ABSTRACT

A communications system may include a communications device including a first Bluetooth transceiver. The first Bluetooth transceiver may comprise a clock. The first Bluetooth transceiver may be capable of scanning a plurality of different operating frequencies for a pairing request based upon the clock. The communications device may further include an output device coupled with the Bluetooth transceiver and capable of outputting data associated with the clock via a communications path different than Bluetooth. The system may also include a mobile communications device including an input device capable of receiving the clock data from the output device via the communications path, and a second Bluetooth transceiver coupled with the input device and capable of generating the pairing request based upon the received clock data.

21 Claims, 7 Drawing Sheets

(56) References Cited

U.S. PATENT DOCUMENTS

| | | | |
|---|---|---|---|
| 2005/0251003 A1* | 11/2005 | Istvan et al. .................... | 600/393 |
| 2006/0129679 A1* | 6/2006 | Hlasny .......................... | 709/227 |
| 2007/0042807 A1* | 2/2007 | Khoo ............................ | 455/557 |
| 2008/0048986 A1* | 2/2008 | Khoo ............................ | 345/168 |
| 2008/0279137 A1 | 11/2008 | Pernu et al. | |
| 2009/0111378 A1 | 4/2009 | Sheynman et al. | |
| 2009/0156126 A1* | 6/2009 | Willis .......................... | 455/41.3 |
| 2010/0105324 A1 | 4/2010 | Takayama | |
| 2011/0028091 A1 | 2/2011 | Higgins et al. | |
| 2011/0077056 A1* | 3/2011 | Park et al. ................... | 455/569.1 |
| 2011/0183614 A1* | 7/2011 | Tamura ......................... | 455/41.2 |
| 2011/0302653 A1* | 12/2011 | Frantz et al. .................... | 726/22 |
| 2011/0304585 A1* | 12/2011 | Chang et al. .................. | 345/174 |
| 2011/0312273 A1* | 12/2011 | Harris .......................... | 455/41.2 |
| 2012/0124444 A1* | 5/2012 | Husted et al. ................. | 714/748 |
| 2012/0133554 A1* | 5/2012 | Bromley et al. .......... | 342/357.25 |
| 2012/0246034 A1* | 9/2012 | Kolios et al. ................. | 705/27.1 |
| 2013/0029596 A1* | 1/2013 | Preston et al. ................ | 455/41.1 |
| 2013/0095757 A1* | 4/2013 | Abdelsamie et al. ......... | 455/41.1 |
| 2014/0122908 A1* | 5/2014 | de Cesare et al. ............. | 713/300 |
| 2014/0169795 A1* | 6/2014 | Clough .......................... | 398/106 |
| 2014/0365305 A1* | 12/2014 | Arditi et al. ................. | 705/14.58 |

OTHER PUBLICATIONS

U.S. Appl. No. 12/888,642, filed Sep. 23, 2010.

"Bluetooth-An Overview" www.swedetrack.com/images/bluet14.hml , 2001.

"Gaster DAta Transfer with Bluetooth and Contactless Communication" http://java.sun.com/developer/technicalArticles/javame/nfc_bluetooth/ , Jul. 2009.

"NFC Forum: Bluetooth Secure simple Pairing Using NFC" NFCForum-AD-BTSSP_1.0: Oct. 18, 2011.

"NFC Forum: Connection Handover" nfcfORUM-ts-cONNECTIONhANDOVER_1_2.DOC: Jul. 7, 2010.

* cited by examiner

MOBILE COMMUNICATIONS SYSTEM PROVIDING ENHANCED OUT OF BAND (OOB) BLUETOOTH PAIRING AND RELATED METHODS

TECHNICAL FIELD

This application relates to the field of communications, and more particularly, to mobile wireless communications systems and related methods.

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile communications devices. This short-range high frequency wireless communications technology exchanges data between devices over a short distance, such as only a few centimeters.

NFC technology may also be used in association with other short-range wireless communications, such as a wireless Bluetooth connection. For example, an NFC connection may often used to establish an out of band (OOB) wireless Bluetooth connection in which a Bluetooth MAC address, which is used for establishing the Bluetooth connection, is communicated via NFC.

DETAILED DESCRIPTION

Figure 1:
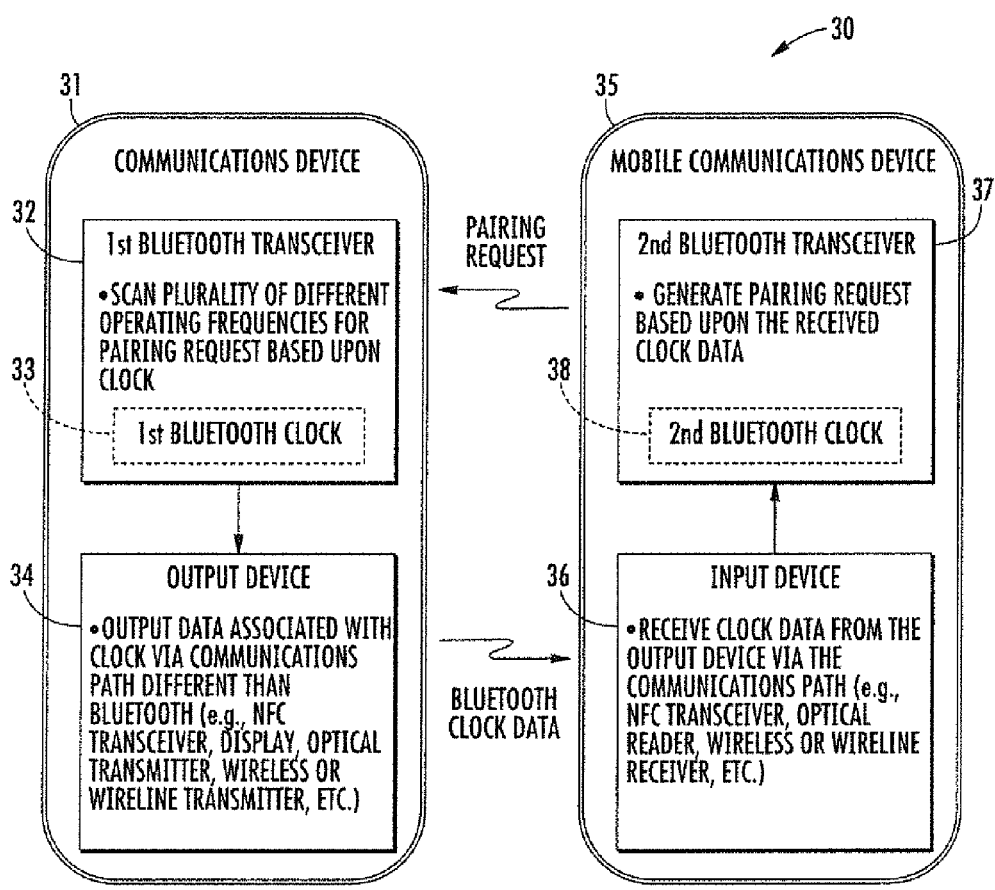
FIG. 1 is a schematic block diagram of a communications system in accordance with an example embodiment.

The present description is made with reference to example embodiments. However, many different embodiments may be used, and thus the description should not be construed as limited to the embodiments set forth herein. Rather, these embodiments are provided so that this disclosure will be thorough and complete. Like numbers refer to like elements throughout.

Generally speaking, a communications system is provided herein which may include a communications device including a first Bluetooth transceiver. The first Bluetooth transceiver may comprise a clock. The first Bluetooth transceiver may be capable of scanning a plurality of different operating frequencies for a pairing request based upon the clock. The communications device may further include an output device coupled with the Bluetooth transceiver and capable of outputting data associated with the clock via a communications path different than Bluetooth. The system may also include a mobile communications device comprising an input device capable of receiving the clock data from the output device via the communications path, and a second Bluetooth transceiver coupled with the input device and capable of generating the pairing request based upon the received clock data. As such, the system may advantageously allow for out of band (OOB) pairing, yet with reduced pairing times by adjusting a paging sequence in view of the clock of the target Bluetooth transceiver.

By way of example, the output device may comprise a first near field communication (NFC) transceiver, and the input device may comprise a second NFC transceiver. In accordance with another example, the output device may comprise a display configured to display a visual indicium or indicia (e.g., a Quick Response (QR) code, etc.) representing the clock data, and the input device may comprise an optical reader for reading the visual indicia. In yet another example embodiment, the output device may comprise a wireline transmitter, and the input device may comprise a corresponding wireline receiver (e.g., USB, etc.). Still another example embodiment is provided in which the output device comprises a wireless transmitter, and the input device may comprise a corresponding wireless receiver (e.g., wireless local area network (WLAN), personal area network (PAN), ultra wideband (UWB), infrared, TransferJet, etc.).

The second Bluetooth transceiver may be capable of generating the pairing request based upon a paging sequence, and changing the paging sequence based upon the received clock data. By way of example, the clock data may comprise an absolute clock value. In accordance with another example, the clock data may comprise clock offset data.

A related mobile communications device, such as the one described briefly above, is also provided. Furthermore, a communications method for a first Bluetooth transceiver and a mobile communications device including a second Bluetooth transceiver may include receiving clock data associated with the first Bluetooth transceiver at the mobile communications device via a communications path different than Bluetooth. The method may further include generating a pairing request with the second NFC transceiver for pairing with the first Bluetooth transceiver based upon the received clock data.

A related non-transitory computer-readable medium may be for causing a mobile communications device to perform steps including receiving clock data associated with a first Bluetooth transceiver via a communications path different than Bluetooth, and generating a pairing request with a second NFC transceiver of the mobile communications device for pairing with the first Bluetooth transceiver based upon the received clock data.

Referring initially to FIG. 1, a communications system 30 and associated method aspects are first described. The system 30 illustratively includes a communications device 31 including a first Bluetooth transceiver 32, which comprises a first Bluetooth clock 33. The communications device 31 further illustratively includes an output device 34 coupled with the Bluetooth transceiver 32. The system 31 also illustratively includes a mobile communications device 35 (also referred to as a "mobile device" herein) including an input device 36 and a second Bluetooth transceiver 37 coupled with the input device 36. The second Bluetooth transceiver 37 includes a second Bluetooth clock 38. Example mobile devices 35 may include portable or personal media players (e.g., music or MP3 players, video players, etc.), portable gaming devices, portable or mobile telephones, smartphones, portable computers such as tablet computers, digital cameras, etc. The communications device 31 may also be a portable communications device, or it may be a "stationary" device in the sense that it is not ordinarily carried by a user, such as a desktop computer, for example.

For two Bluetooth devices to communicate, they first establish a communications link between them by a process called pairing. During the pairing process, the two devices establish a relationship by creating a shared secret known as a link key. If a link key is stored by both devices they are said to be paired or bonded. In accordance with the Bluetooth Core Specification v2.1., for example, a Secure Simple Pairing (SSP) method may be used for Bluetooth device pairing. SSP has four different modes, namely a "just works" mode, a numeric comparison mode, a passkey entry mode, and an out of band (OOB) mode. The OOB mode uses an external or separate communication transport path (i.e., different than Bluetooth), such as Near Field Communication (NFC), to exchange some information used in the pairing process. Pairing is completed by the Bluetooth transceivers, but this requires information from the OOB transfer, namely the Bluetooth MAC address of the target device. As used herein, "Bluetooth" includes wireless communication in accordance with one or more of the various Bluetooth Core Specifications (v1.0/v1.0 B, v1.1, v1.2, v2.0, v2.1, v3.0, v4.0, etc.), including Bluetooth low energy (BLE) communication.

More particularly, NFC P2P (Peer-to-Peer) OOB Bluetooth pairing is based on a standard proposed by the NFC Forum. See "Bluetooth Secure Simple Pairing Using NFC", Application Document, NFC Forum, NFCForum-AD-BTSSP_1.0, Oct. 18, 2011; and "Connection Handover", Technical Specification, NFC Forum, Connection Handover 1.2, NFCForum-TS-ConnectionHandover_1_2.doc, Jul. 7, 2010, both of which are hereby incorporated herein in their entireties by reference. In the standard, the target Bluetooth MAC address is the only Bluetooth related information that is expected to be transmitted over NFC. By way of background, NFC is a short-range wireless communications technology in which NFC-enabled devices are "swiped," "bumped" or otherwise moved in close proximity to communicate. In one non-limiting example implementation, NFC may operate at 13.56 MHz and with an effective range of several centimeters (typically up to about 4 cm, or up to about 10 cm, depending upon the given implementation), but other suitable versions of near field communication which may have different operating frequencies, effective ranges, etc., for example, may also be used.

With respect to OOB pairing, exchanging of only the target Bluetooth MAC address leads to connection times that are sometimes greater than desirable, and potentially in the range of several seconds. More specifically, Bluetooth pairing connection times may vary significantly depending on which scan repetition modes are chosen by the target device and the connecting device, as well as the clock states of each device. In the example of FIG. 1, the communication device 31 is the target (or slave) device, and the mobile communications device 35 is the connecting (or master) device.

With respect to SSP, there are three possible inquiry and page scan modes for the connecting and target devices providing a possibility of nine connection scenarios. These scan modes includes an R0 mode (continuous scanning), an R1 mode (scans every 1.28 seconds), and an R2 mode (scans every 2.56 seconds). By way of example, with just a target MAC address to work with and an appropriate combination of scan repetition modes, an average expected Bluetooth pairing time is approximately 1.5 seconds with the target device in R1 mode and the connecting device also in R1 mode, as will be described further below. If the target device is instead in R2 mode, then the expected connection time increases to approximately three seconds as a result of the above-noted scan rate. R1 and R2 modes are more frequently used for inquiry and page scanning, as the R0 mode may undesirably block other Bluetooth communications.

However, when using the NFC P2P transfer functionality for GOB pairing, there may be an expectation from many end users that the pairing connection will be established and the transfer commence nearly instantaneously due to the speed with which other NFC transactions may be performed (e.g., reading a smart poster tag, scanning a security badge, etc.). Yet, to perform an OOB Bluetooth pairing, an NFC connection is first established, the Bluetooth MAC address information is exchanged, and then the Bluetooth connection is established. Given the above-described pairing scan times when only the target Bluetooth MAC address is known, this results in an overall Bluetooth connection time which may take several seconds. In some cases the pairing process may even time out and be discontinued, depending on the given time out settings of the devices.

To help expedite Bluetooth OOB pairing, the communications device 31 and the mobile communications device 35 may advantageously exchange additional information over the separate (non-Bluetooth) communications path regarding the first Bluetooth clock 33 to decrease the Bluetooth connection time. By way of example, the clock data may comprise an absolute clock value indicating a current clock count for the first Bluetooth clock 33, indicating where the clock is in its counting sequence. This information may advantageously be used by the second Bluetooth transceiver 37 to determine an offset with respect to the first Bluetooth clock 33, so that it may thereby adjust its paging scan sequence to more readily pair with the first Bluetooth transceiver 32. In other embodiments, the clock offset data may be determined as part of the NFC exchange.

Given the importance of clock data accuracy to properly adjusting the paging scan to achieve shorter pairing times, in some embodiments it may be desirable to account for any delay or latency in the communications path from the output device 34 to the input device 36. More particularly, one or both of the output device 34 and the input device 36 may consider the delay between the time of reading the clock data from the first Bluetooth clock 33 to providing the clock data to the second Bluetooth transceiver 37. For example, one or both of the output device 34 and the input device 36 may add in a delay or otherwise provide for the adjustment of the clock data to account for any latency in providing this data over the communications path. In accordance with one example implementation, the output device 34 may account for the delay between reading of the clock data from the first Bluetooth clock 33 and outputting of the clock data for the input device 36. Moreover, the input device 36 may account for the delay from the transmission of the clock data from the output device 34 to the time of providing the clock data to the second Bluetooth transceiver 37. By way of example, these delays may be added on to the absolute clock value, and the delay may be estimated or measured (or both).

Figure 2:
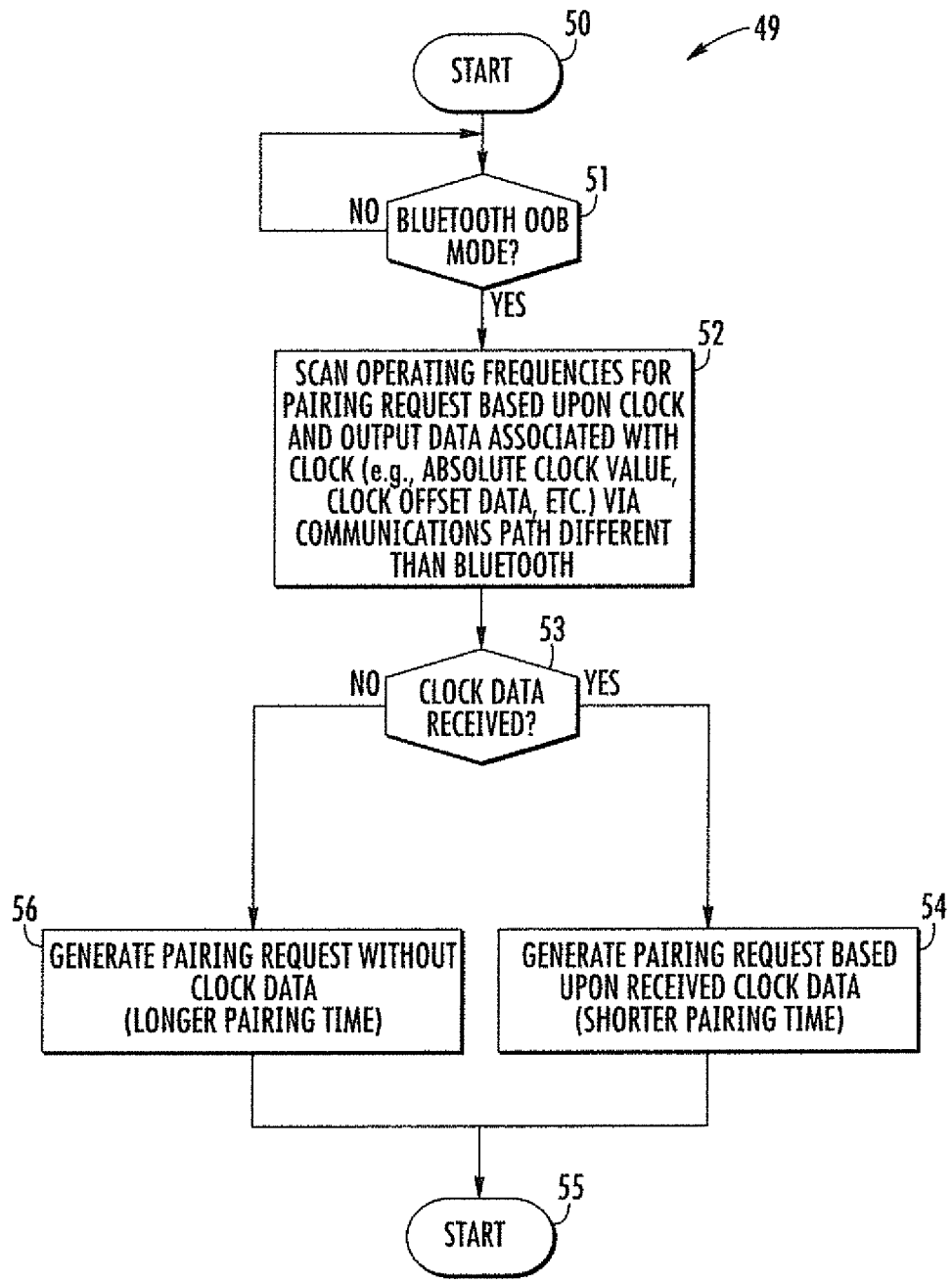
FIG. 2 is a flow diagram illustrating method aspects associated with the system of FIG. 1.

Referring additionally to the flow diagram 49 of FIG. 2, the first Bluetooth transceiver 32 may be capable of scanning a plurality of different operating frequencies for a pairing request based upon the first Bluetooth clock 33. In an example embodiment, the first Bluetooth clock 33 and the second Bluetooth clock 38 may have a counting cycle of approximately forty seconds, during which the first Bluetooth transceiver 32 and the second Bluetooth transceiver 37 will cycle once through all of the thirty-two available Bluetooth communication frequencies (in R1 mode).

Beginning at Block 50, when using a Bluetooth OOB mode (Block 51), for example, the output device 34 is capable of or configured to output the above-noted data associated with the first Bluetooth clock 33 via a communications path different than Bluetooth (i.e., it is not wirelessly communicated from the first Bluetooth transceiver 32 to the second Bluetooth transceiver 37 via Bluetooth communications), at Block 52. Moreover, the input device 36 may be capable of or configured to receive the clock data from the output device 34 via the communications path, at Block 53. By way of example, the output device 34 and the input device 36 may each respectively comprise a NFC transceiver to advantageously allow for exchange of the clock data via an NFC communications link. Also by way of example, the clock data may be included in an extended inquiry response (BIR) or other appropriate NFC data field, for example.

Figure 3:
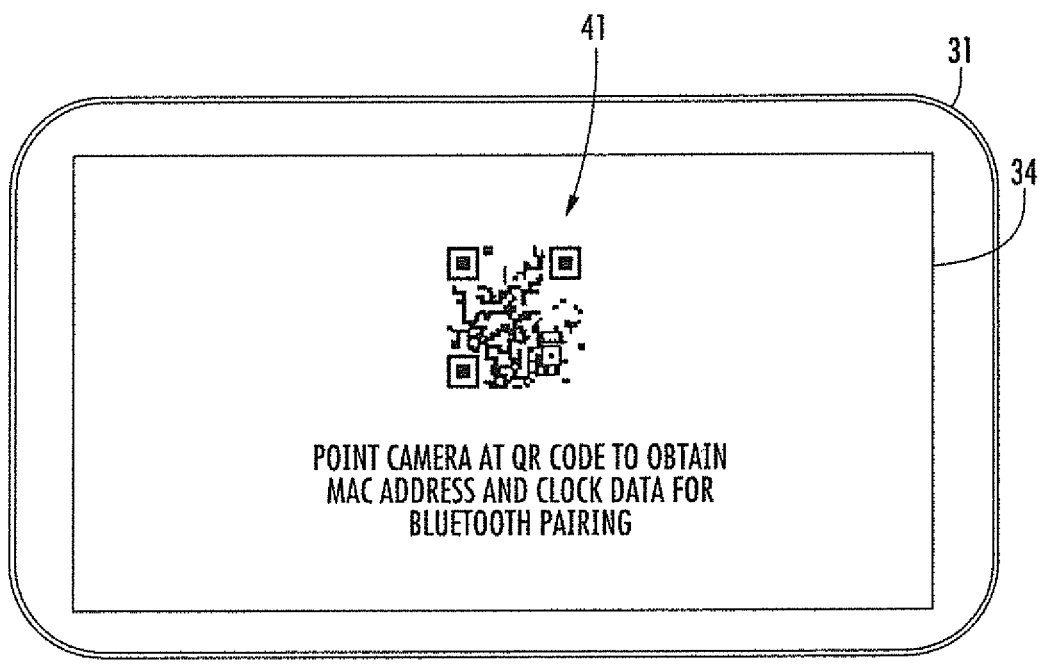
FIG. 3 is a front view of an example communications device that may be used with the system of FIG. 1.
Figure 4:
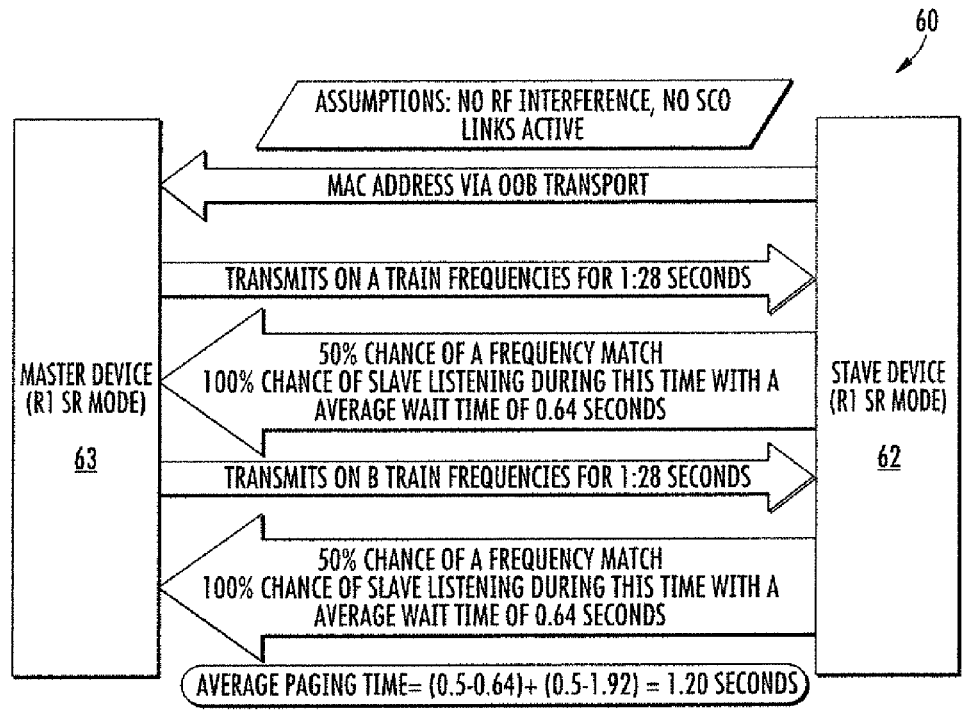
FIGS. 4-9 are schematic block diagrams illustrating pairing sequences which may be performed by the devices of FIG. 1.
Figure 5:
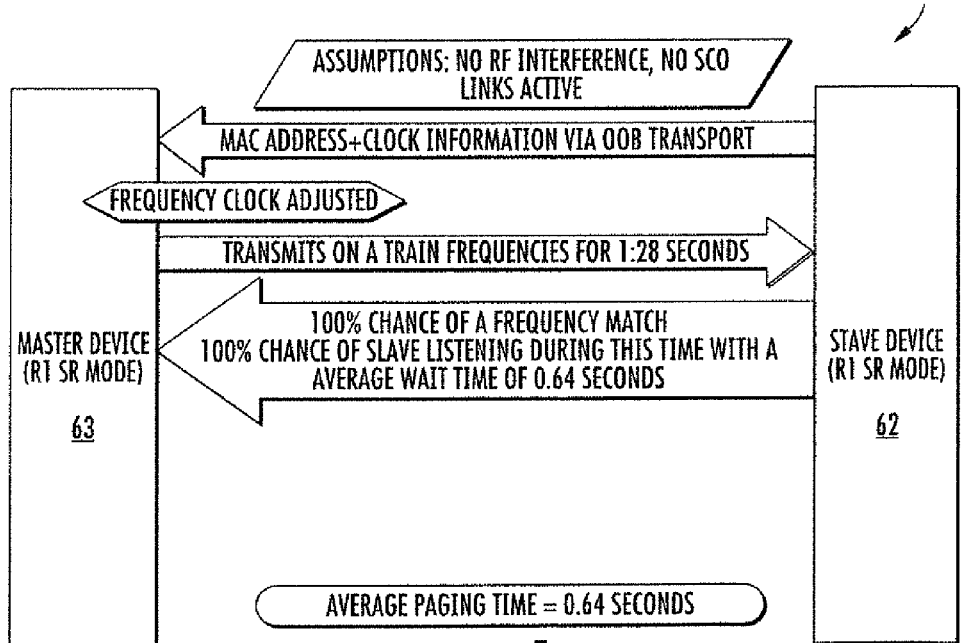
Figure 6:
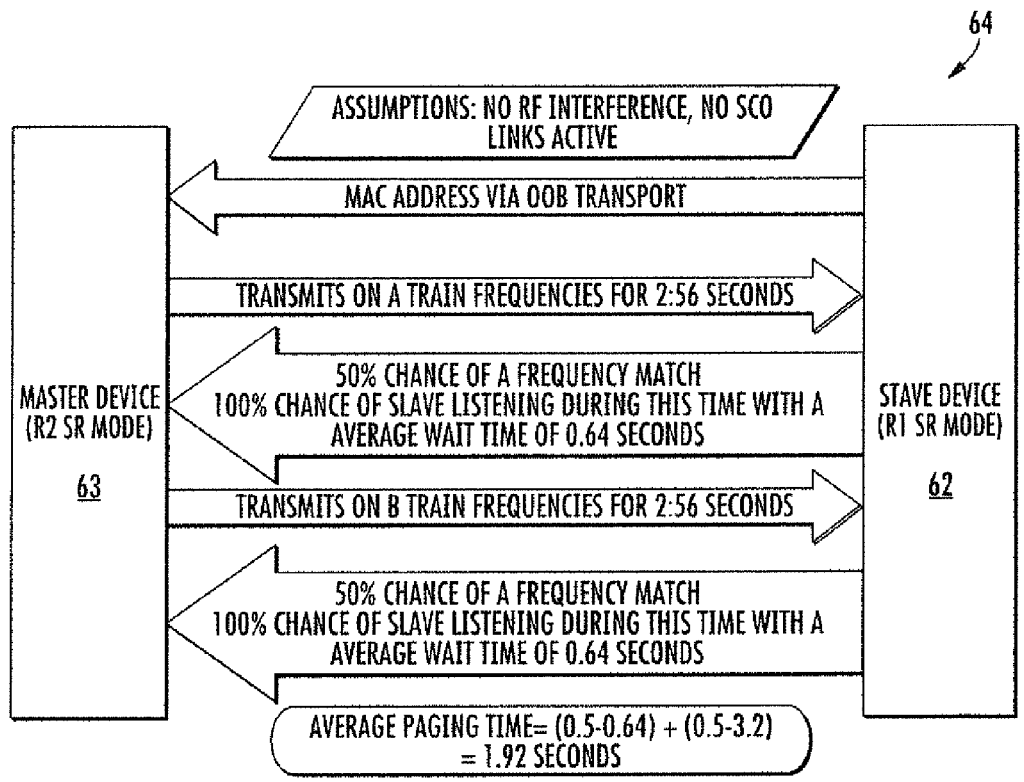
Figure 7:
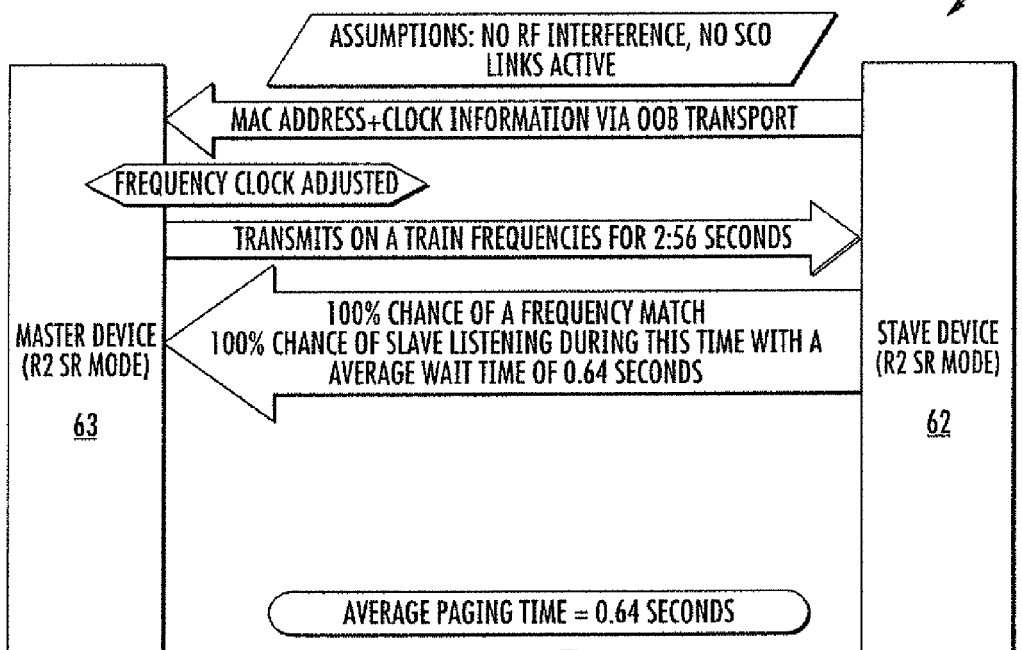
Figure 8:
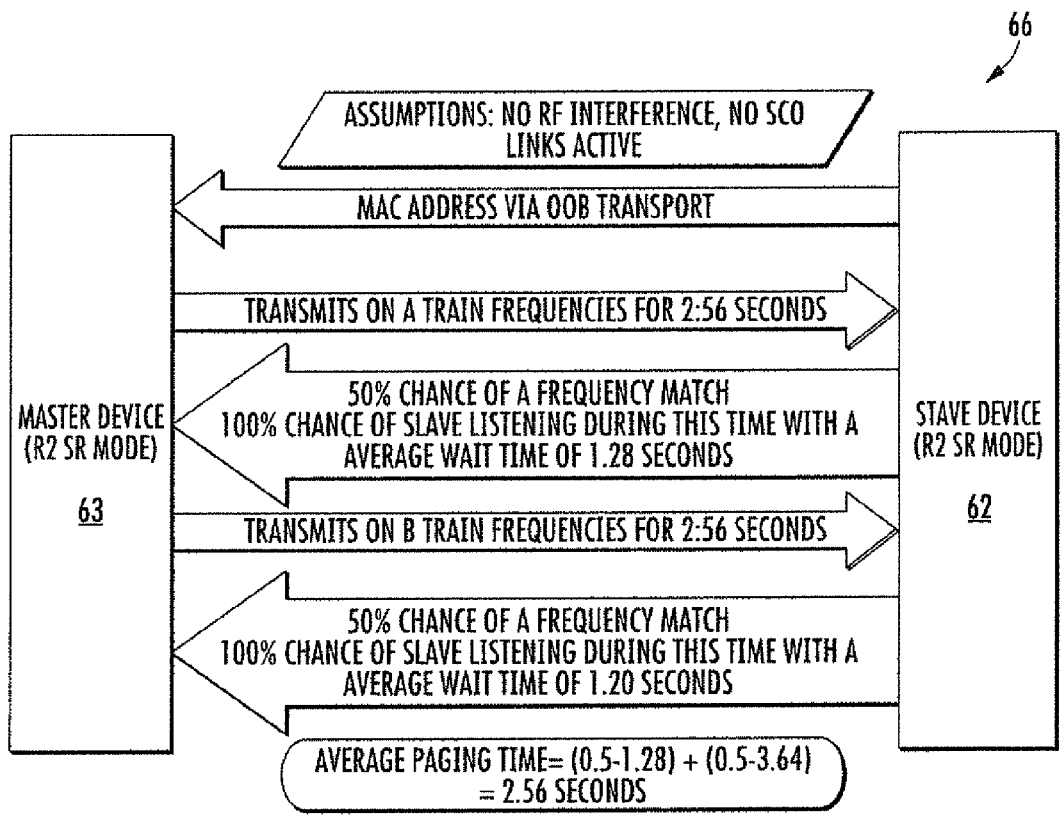
Figure 9:
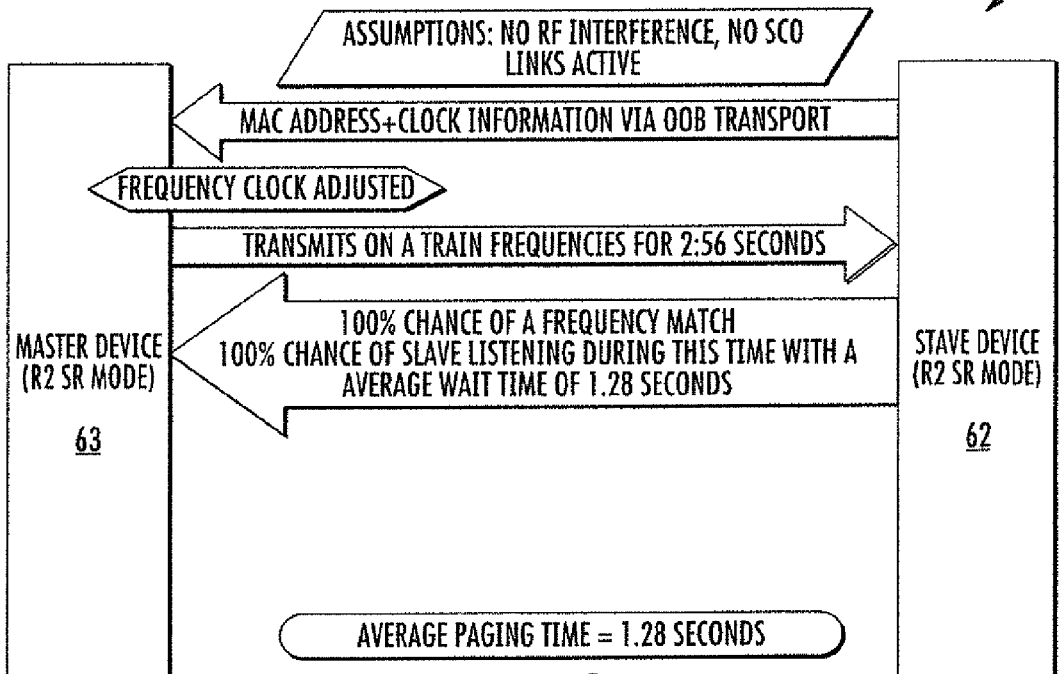

Referring additionally to FIG. 3, another communications path which may be used is an optical communications path. In the illustrated example, the communications device 31 comprises a tablet computer including a display which operates as the output device 34. More particularly, a visual indicium or indicia may be displayed on the display 41, which may in turn be read by an optical sensor (e.g., a charge-coupled device (CCD)) which operates as the input device 36 of the mobile device 35. In the illustrated example, a Quick Response (QR) code is displayed on the display, which is used to transfer not only the Bluetooth MAC address of the first Bluetooth transceiver 32, but also the above-noted clock data. In other embodiments, pixels on the display 34 may be modulated to provide an optical data transmission of the clock data, for example.

In accordance with another example embodiment, the output device 34 may comprise a wireline transmitter (e.g., USB, etc.), and the input device 36 may comprise a corresponding wireline receiver. In still another example embodiment, the output device 34 may comprise a wireless transmitter (e.g., wireless local area network (WLAN), personal area network (PAN), ultra wideband (UWB), infrared, TransferJet, etc.), and the input device 36 may comprise a corresponding wireless receiver.

By having the benefit of the received clock data, the second Bluetooth transceiver 37 may advantageously change its Bluetooth paging sequence based upon the received clock data, at Block 54, which illustratively concludes the method of FIG. 2 (Block 55). However, pairing may be performed even if the clock data is not received, at Block 56, but this may result in longer average pairing times, as noted above, As such, the system 30 may advantageously allow for OOB pairing, yet with reduced pairing times, by adjusting the paging sequence in view of the first Bluetooth clock 31 of the first Bluetooth transceiver 32. More particularly, if the target Bluetooth clock offset with respect to the first Bluetooth clock 33 is known, then it is possible to halve the expected pairing time down to approximately 0.64 seconds (when the first Bluetooth transceiver 32 and the second Bluetooth transceiver 37 are both in R1 mode, as will be described further below). More particularly, by knowing the first Bluetooth clock 33 offset, which effectively lets the second Bluetooth transceiver 37 predict which frequency the first Bluetooth transceiver 32 will be listening on, the second Bluetooth transceiver 37 may adjust the set of paging scan frequencies that it will use to first attempt a pairing.

The foregoing will be further understood with reference to an example use case utilizing NFC as the initial communications transport path for OOB pairing. Upon detection of an NFC connection at the target device (i.e., the communications device 31), a command is sent to the first Bluetooth transceiver 32 firmware to inquire what the current clock value is. This offset may be used by the second Bluetooth transceiver 37 to calculate the current frequency that the first Bluetooth transceiver 32 will be using to scan for incoming paging connections. The clock offset is then communicated to the NFC firmware, and an EIR record (which may be reserved for manufacturer specific information, for example) is created to encapsulate the current Bluetooth clock offset data. In accordance with another example, a NFC Data Exchange Format (NDEF) record may also be used to transfer the Bluetooth clock information.

Once the connecting device (i.e., the mobile device 35) receives the OOB pairing information, it checks to see if a record (EIR, NDEF, etc.) was included for the Bluetooth clock information (Block 53, FIG. 2). If the clock information was received, a command is sent to the second Bluetooth transceiver 37 firmware to adjust its current paging sequence offset so that outgoing paging attempts are expected to match the target frequency on the first or second paging packet.

The differences in pairing times for GOB Bluetooth pairing with and without exchanging clock data will now be further described with reference to FIGS. 4-9. For the following examples, it is assumed that there is no RF interference, and that there are no SCO (synchronous connection orientated) links active. In pairing sequences 60 and 61 shown in FIGS. 4 and 5, respectively, a slave device 62 (which would correspond to the communications device 31 or target device described above) provides its Bluetooth MAC address via an GOB communications transport path (e.g., NFC, optical, wireline, wireless, etc.) to a master device 63 (which would correspond to the mobile device 35 or connecting device described above). However, the above-described clock data is only transmitted to the master device 63 in the pairing sequence 61, and not in the pairing sequence 60.

Accordingly, in the pairing sequence 60, after receipt of the Bluetooth MAC address via the OOB transport path, the master device 63 begins transmitting on A train frequencies for 1.28 seconds, but there is only a 50% chance of a frequency match with the inquiry scan of the slave device 62, even though there is a 100% chance that the slave device will be listening during this time with an average wait time of 0.64 seconds. This is because without the benefit of the clock offset information, a frequency clock adjustment cannot be performed by the master device 63 to attempt to synchronize the paging and inquiry scans, as occurs in the pairing sequence 61 of FIG. 5. Thus, a second transmission on B train may be required for the pairing sequence 60, leading to an average pairing time of approximately 1.28 second, whereas this second pairing scan may be avoided in the pairing sequence 61 to advantageously reduce the average paging time to about 0.64 seconds.

Pairing sequences 64 and 65 are respectively similar to the pairing sequences 60 and 61 described above, except in these examples the master device 63 is operating in the R2 scan mode, rather than R1. This results in an average paging time of approximately 2.24 seconds for the pairing sequence 64 (without clock data), versus an average paging time of 0.64 seconds for the paging sequence 65 (with clock data). Similarly, the pairing sequences 66 and 67 are respectively similar to the pairing sequences 64 and 65, with the exception that the slave device 62 is also using the R2 scan mode (i.e., both the slave device 62 and the master device 63 are using the R2 scanning mode in these examples). As a result, there is an average paging time of approximately 2.56 seconds for the pairing sequence 64 (without clock data), versus an average paging time of approximately 1.28 seconds for the paging sequence 63 (with clock data).

Example components of a mobile communications device 1000 that may be used in accordance with the above-described embodiments are further described below with reference to FIG. 10. The device 1000 illustratively includes a housing 1200, a keyboard or keypad 1400 and an output device 1600. The output device shown is a display 1600, which may comprise a full graphic LCD. Other types of output devices may alternatively be utilized. A processing device 1800 is contained within the housing 1200 and is coupled between the keypad 1400 and the display 1600. The processing device 1800 controls the operation of the display 1600, as well as the overall operation of the mobile device 1000, in response to actuation of keys on the keypad 1400.

The housing 1200 may be elongated vertically, or may take on other sizes and shapes (including clamshell housing structures). The keypad may include a mode selection key, or other hardware or software for switching between text entry and telephony entry.

Figure 10:
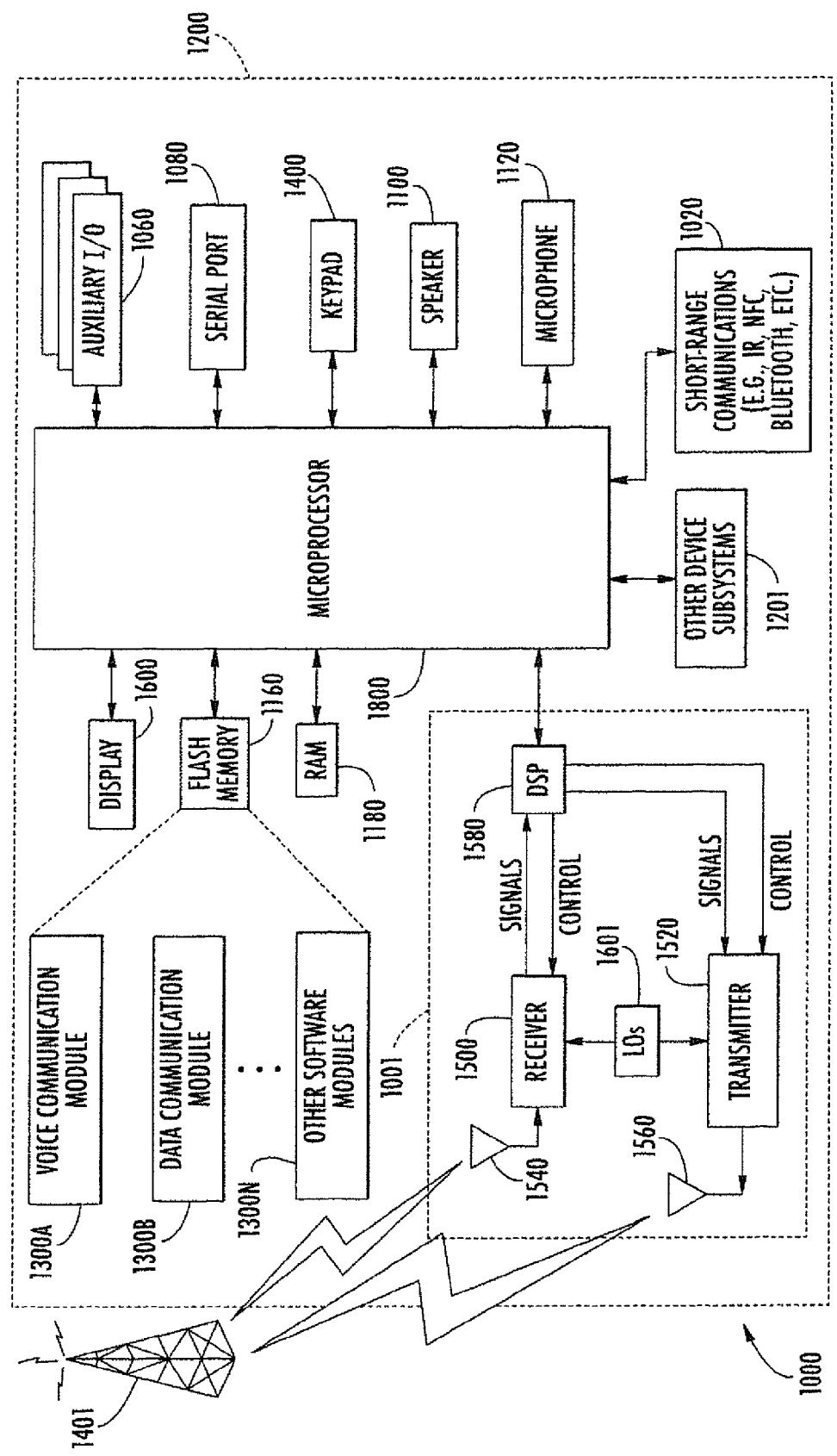
FIG. 10 is a schematic block diagram illustrating mobile communications device components that may be used in accordance with an example embodiment.

In addition to the processing device 1800, other parts of the mobile device 1000 are shown schematically in FIG. 10. These include a communications subsystem 1001; a short-range communications subsystem 1020; the keypad 1400 and the display 1600, along with other input/output devices 1060, 1080, 1100 and 1120; as well as memory devices 1160, 1180 and various other device subsystems 1201. The mobile device 1000 may comprise a two-way RF communications device having data and, optionally, voice communications capabilities. In addition, the mobile device 1000 may have the capability to communicate with other computer systems via the Internet.

Operating system software executed by the processing device 1800 is stored in a persistent store, such as the flash memory 1160, but may be stored in other types of memory devices, such as a read only memory (ROM) or similar storage element. In addition, system software, specific device applications, or parts thereof, may be temporarily loaded into a volatile store, such as the random access memory (RAM) 1180. Communications signals received by the mobile device may also be stored in the RAM 1180.

The processing device 1800, in addition to its operating system functions, enables execution of software applications 1300A-1300N on the device 1000. A predetermined set of applications that control basic device operations, such as data and voice communications 1300A and 1300B, may be installed on the device 1000 during manufacture. In addition, a personal information manager (PIM) application may be installed during manufacture. The PIM may be capable of organizing and managing data items, such as e-mail, calendar events, voice mails, appointments, and task items. The PIM application may also be capable of sending and receiving data items via a wireless network 1401. The PIM data items may be seamlessly integrated, synchronized and updated via the wireless network 1401 with corresponding data items stored or associated with a host computer system.

Communication functions, including data and voice communications, are performed through the communications subsystem 1001, and possibly through the short-range communications subsystem. The communications subsystem 1001 includes a receiver 1500, a transmitter 1520, and one or more antennas 1540 and 1560. In addition, the communications subsystem 1001 also includes a processing module, such as a digital signal processor (DSP) 1580, and local oscillators (LOs) 1601. The specific design and implementation of the communications subsystem 1001 is dependent upon the communications network in which the mobile device 1000 is intended to operate. For example, a mobile device 1000 may include a communications subsystem 1001 designed to operate with the Mobitex™, Data TAC™ or General Packet Radio Service (GPRS) mobile data communications networks, and also designed to operate with any of a variety of voice communications networks, such as AMPS, TDMA, CDMA, WCDMA, PCS, GSM, EDGE, etc. Other types of data and voice networks, both separate and integrated, may also be utilized with the mobile device 1000. The mobile device 1000 may also be compliant with other communications standards such as 3GSM, 3GPP, UMTS, 4G, etc.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically involves use of a subscriber identity module, commonly referred to as a SIM card, in order to operate on a GPRS network.

When required network registration or activation procedures have been completed, the mobile device 1000 may send and receive communications signals over the communication network 1401. Signals received from the communications network 1401 by the antenna 1540 are routed to the receiver 1500, which provides for signal amplification, frequency down conversion, filtering, channel selection, etc., and may also provide analog to digital conversion. Analog-to-digital conversion of the received signal allows the DSP 1580 to perform more complex communications functions, such as demodulation and decoding. In a similar manner, signals to be transmitted to the network 1401 are processed (e.g. modulated and encoded) by the DSP 1580 and are then provided to the transmitter 1520 for digital to analog conversion, frequency up conversion, filtering, amplification and transmission to the communication network 1401 (or networks) via the antenna 1560.

In addition to processing communications signals, the DSP 1580 provides for control of the receiver 1500 and the transmitter 1520. For example, gains applied to communications signals in the receiver 1500 and transmitter 1520 may be adaptively controlled through automatic gain control algorithms implemented in the DSP 1580.

In a data communications mode, a received signal, such as a text message or web page download, is processed by the communications subsystem 1001 and is input to the processing device 1800. The received signal is then further processed by the processing device 1800 for an output to the display 1600, or alternatively to some other auxiliary I/O device 1060. A device may also be used to compose data items, such as e-mail messages, using the keypad 1400 and/or some other auxiliary I/O device 1060, such as a touchpad, a rocker switch, a thumb-wheel, or some other type of input device. The composed data items may then be transmitted over the communications network 1401 via the communications subsystem 1001.

In a voice communications mode, overall operation of the device is substantially similar to the data communications mode, except that received signals are output to a speaker 1100, and signals for transmission are generated by a microphone 1120. Alternative voice or audio I/O subsystems, such as a voice message recording subsystem, may also be implemented on the device 1000. In addition, the display 1600 may also be utilized in voice communications mode, for example to display the identity of a calling party, the duration of a voice call, or other voice call related information.

The short-range communications subsystem enables communication between the mobile device 1000 and other proximate systems or devices, which need not necessarily be similar devices. For example, the short-range communications subsystem may include an infrared device and associated circuits and components, a Bluetooth™ communications module to provide for communication with similarly-enabled systems and devices, or a near field communications (NFC) device (which may include an associated secure element) for communicating with another NFC device or NFC tag via NFC communications.

Many modifications and other embodiments will come to the mind of one skilled in the art having the benefit of the teachings presented in the foregoing descriptions and the associated drawings. Therefore, it is understood that various modifications and embodiments are intended to be included within the scope of the appended claims.

That which is claimed is:

1. A communications system including:
   a communications device including
      a first Bluetooth transceiver including a clock, the first Bluetooth transceiver being capable of scanning a plurality of different operating frequencies for a pairing request in a plurality of different scan modes based upon the clock, and
      an output device coupled with the first Bluetooth transceiver and capable of outputting data associated with the clock and a current scan mode of said first Bluetooth transceiver via a communications path different than Bluetooth; and
   a mobile communications device including
      an input device capable of receiving the clock data from the output device via the communications path, and
      a second Bluetooth transceiver coupled with the input device and capable of predicting the current scan mode of the first Bluetooth transceiver based upon the received clock data and generating the pairing request based upon a paging sequence, the paging sequence corresponding with the received clock data and the predicted current scan mode of said first Bluetooth transceiver.

2. The communications system of claim 1 wherein the output device comprises a first near field communication (NFC) transceiver; and wherein the input device comprises a second NFC transceiver.

3. The communications system of claim 1 wherein the output device comprises a display configured to display at least one visual indicium representing the clock data; and wherein the input device comprises an optical reader for reading the at least one visual indicium.

4. The communications system of claim 3 wherein the at least one visual indicium comprises a Quick Response (QR) code.

5. The communications system of claim 1 wherein the output device comprises a wireline transmitter; and wherein the input device comprises a wireline receiver.

6. The communications system of claim 1 wherein the output device comprises a wireless transmitter; and wherein the input device comprises a wireless receiver.

7. The communications system of claim 1 wherein the clock data comprises an absolute clock value.

8. The communications system of claim 1 wherein the clock data comprises clock offset data.

9. The communications system of claim 1 wherein the first Bluetooth transceiver is capable of scanning the plurality of different operating frequencies for the pairing request in an out of band (OOB) operating mode.

10. A mobile communications device including:
    an input device capable of receiving clock data associated with a first Bluetooth transceiver operating in a current scan mode from among a plurality of different scan modes via a communications path different than Bluetooth; and
    a second Bluetooth transceiver coupled with the input device and capable of predicting the current scan mode of the first Bluetooth transceiver based upon the received clock data and generating a pairing request for pairing with the first Bluetooth transceiver based upon a paging sequence, the paging sequence corresponding with the received clock data and the predicted current scan mode of the first Bluetooth transceiver.

11. The mobile communications device of claim 10 wherein the input device comprises a near field communication (NFC) transceiver.

12. The mobile communications device of claim 10 wherein the clock data comprises an absolute clock value.

13. The mobile communications device of claim 10 wherein the clock data comprises clock offset data.

14. A communications method for a first Bluetooth transceiver and a mobile communications device including a second Bluetooth transceiver, the method including:
    receiving clock data associated with the first Bluetooth transceiver operating in a current scan mode from among a plurality of different scan modes at the mobile communications device via a communications path different than Bluetooth; and
    predicting the current scan mode of the first Bluetooth transceiver based upon the received clock data and generating a pairing request with the second NFC transceiver for pairing with the first Bluetooth transceiver based upon a paging sequence, the paging sequence corresponding with the received clock data and the predicted current scan mode of the first Bluetooth transceiver.

15. The communications method of claim 14 wherein the mobile communications device further comprises a near field communication (NFC) transceiver, and wherein the communications path comprises a NFC link.

16. The communications method of claim 14 wherein the clock data comprises an absolute clock value.

17. The communications method of claim 14 wherein the clock data comprises clock offset data.

18. A non-transitory computer-readable medium for causing a mobile communications device to perform steps including:
    receiving clock data associated with a first Bluetooth transceiver operating in a current scan mode from among a plurality of different scan modes via a communications path different than Bluetooth; and
    predicting the current scan mode of the first Bluetooth transceiver based upon the received clock data and generating a pairing request with a second NFC transceiver of the mobile communications device for pairing with the first Bluetooth transceiver based upon a paging sequence, the paging sequence corresponding with the received clock data and the current scan mode of the first Bluetooth transceiver.

19. The non-transitory computer-readable medium of claim 18 wherein the mobile communications device further comprises a near field communication (NFC) transceiver, and wherein the communications path comprises a NFC link.

20. The non-transitory computer-readable medium of claim 18 wherein the clock data comprises an absolute clock value.

21. The non-transitory computer-readable medium of claim 18 wherein the clock data comprises clock offset data.

* * * * *